Sept. 17, 1968  W. B. HULLHORST  3,401,896
METHOD AND APPARATUS FOR PACKAGING MATERIALS
Filed Oct. 21, 1965  3 Sheets-Sheet 1

INVENTOR.
WILLIAM B. HULLHORST
BY Staelin & Overman
ATTORNEYS

Sept. 17, 1968 W. B. HULLHORST 3,401,896
METHOD AND APPARATUS FOR PACKAGING MATERIALS
Filed Oct. 21, 1965 3 Sheets-Sheet 2

INVENTOR.
WILLIAM B. HULLHORST
BY
Staelin & Overman
ATTORNEYS

Sept. 17, 1968  W. B. HULLHORST  3,401,896
METHOD AND APPARATUS FOR PACKAGING MATERIALS
Filed Oct. 21, 1965  3 Sheets-Sheet 3
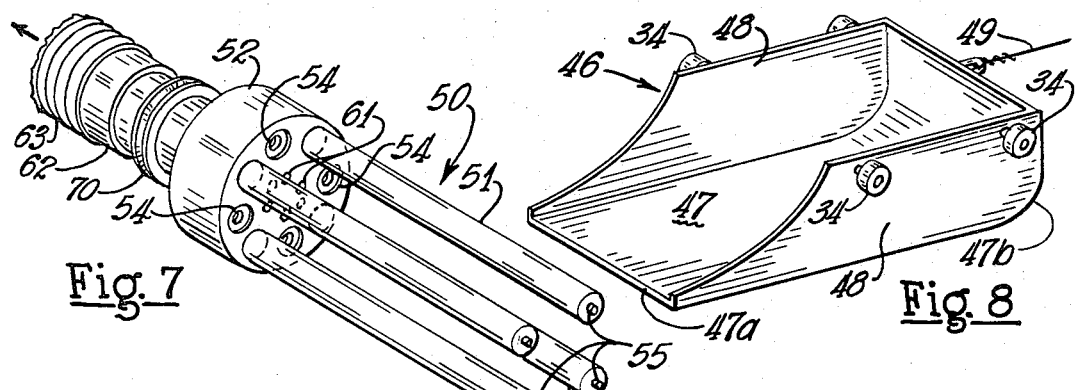
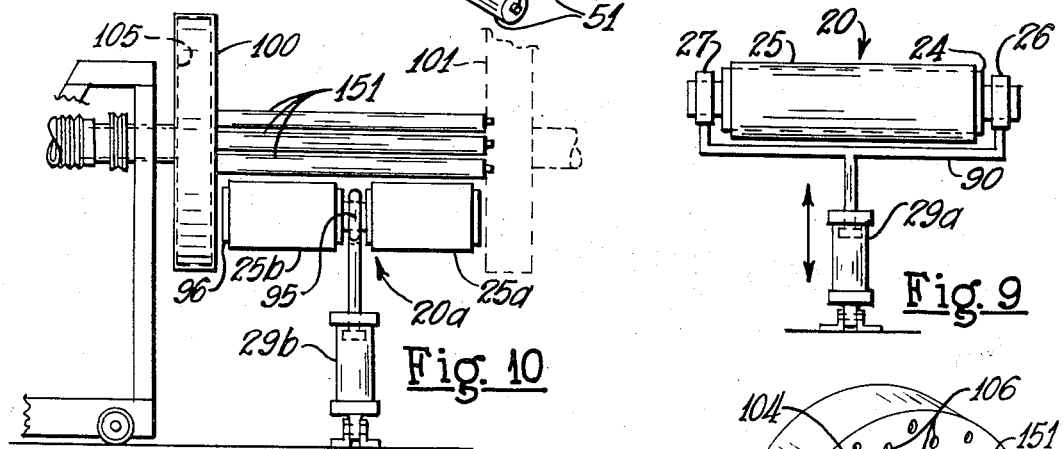
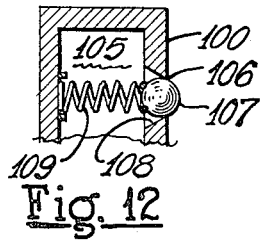
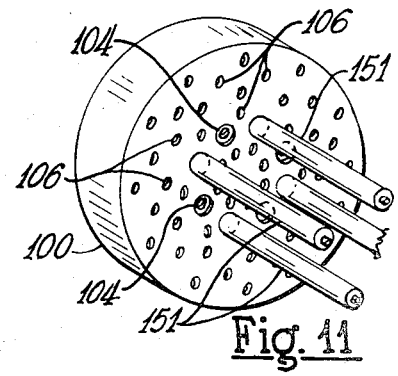
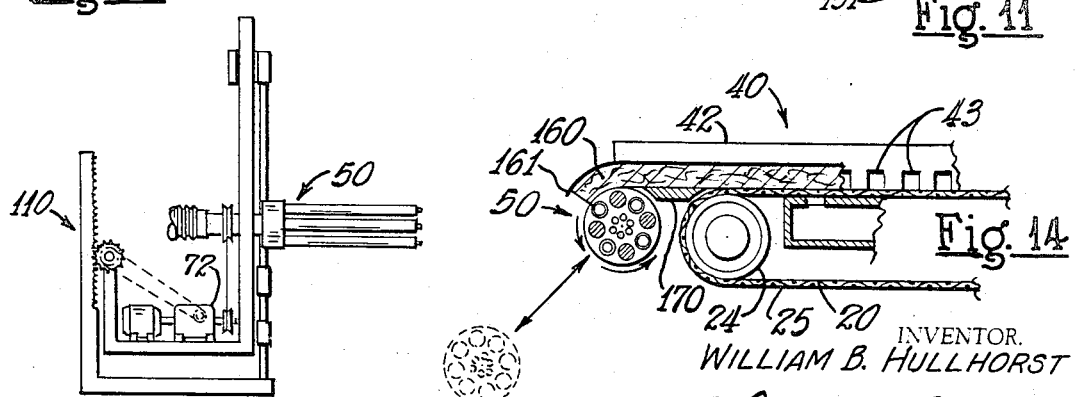
INVENTOR.
WILLIAM B. HULLHORST
BY
Staelin & Overman
ATTORNEYS

United States Patent Office 3,401,896
Patented Sept. 17, 1968

3,401,896
METHOD AND APPARATUS FOR PACKAGING MATERIALS
William B. Hullhorst, Granville, Ohio, assignor to Owens-Corning Fiberglas Corporation, a corporation of Delaware
Filed Oct. 21, 1965, Ser. No. 499,898
25 Claims. (Cl. 242—55.1)

ABSTRACT OF THE DISCLOSURE

A method and apparatus for packaging a length of porous mat in which the mat is compressed by evacuating air from within and rolled into a package in the compressed and evacuated state. A conveyor having air evacuated state. A conveyor having air evacuating plenums along the edges thereof feeds the mat to a rotating mandrel.

---

This invention relates to a method and apparatus for packaging materials in general and, in particular, to a method and means of handling and packaging lengths of fibrous material in a rolled-up form in a manner facilitating handling and transportation of such material.

It has been conventional practice in packaging or preparing fibrous material, as for example, materials formed of glass fibers especially usable for insulation purposes, to roll predetermined lengths of fibrous mats in spiral fashion around a mandrel, while mechanically compressing the spiral roll by rollers or other means as the mandrel is rotated and encircle the finished spiral roll with a sleeve or other holding means to retain the spiral roll in its packaged configuration for shipping or handling.

The above method has been in broad use for quite a while, but attempts to decrease the size of the spiral roll in order to better facilitate handling and to save on shipping costs and storage space have not been successful heretofore. Difficulties have been encountered since exteriorly applied compression to the spiral rolled lengths of fibrous material results in non-uniform compression of the material and in many instances a portion of the length may be compressed to a degree sufficient to break or fracture the individual fibers thus reducing the resiliency of the length of material when unrolled. When such lengths of fibrous material are unpacked for application and use, the fibers, if crushed or broken, will not spring back or revert to their normal expanded condition. The crushing or breaking of the fibers substantially reduces the insulating value, rendering the length of fibrous materials unsatisfactory and inefficient for the purpose intended. Further, when exterior compressive forces have been applied to the loose spiral roll, the convolutions of the rolled up fibrous material or mat were unevenly compressed, the paper became wrinkled or torn and tended to "funnel in" toward the center causing objectionable bulges in the fibrous material.

It is, accordingly, an object of this invention to provide an improved means and method for handling and packaging materials.

It is another object of this invention to provide an improved means and method for packaging fibrous materials which enables the packaging of more fibrous material within the same volume occupied by similar previous packages without breaking or mechanically damaging the fibers and thus not reducing the insulating value nor the resiliency of such material so that the fibers will spring back to their normal expanded condition when the package is removed.

It is still another object of this invention to provide an improved method and means for packaging lengths of fibrous material in a rolled-up configuration.

The invention thus features a method for packaging a length of fibrous material into a rolled-up configuration which comprises the steps of conveying the length to a rotating mandrel, wrapping the length around the mandrel, and evacuating air from within the interior of the length of fibrous material as the length is conveyed to the mandrel. The method further includes applying a negative pressure to a perforated plenum within the rotating mandrel to adhere the length to the mandrel. The method may also advantageously include providing opposed perforated plenum plates at each end of the mandrel and applying a negative pressure to the plenum plates to maintain the evacuation of air from the edges of the length of material as it is rolled onto the mandrel.

The invention features apparatus for carrying out the above method for rolling up under compression a length of fibrous material which may comprise rotatable mandrel means, means for evacuating air from within the fibrous material, and means for feeding the evacuated length of material to the rotatable mandrel means. The feeding means may comprise conveyor means for advancing the length to the rotatable mandrel means while utilizing means for maintaining a substantially constant tension on the length as it is rolled onto the mandrel means. Alternatively, the feeding means may comprise means for advancing the mandrel means over the evacuated length of material. The air evacuating means is shown herein in a preferred embodiment as perforated plenum means adapted for connection to a negative pressure source and disposed adjacent the minor edge surfaces of the length of material, and air barrier means disposed adjacent the major surfaces of the length of fibrous material.

The conveyor means may include foraminous conveyor belt means and plenum means adapted to be connected to a negative pressure source and disposed adjacent one side of the conveyor belt means. The plenum means has apertures formed therein adjacent the belt means thereby creating a low pressure area on the other or opposite side of the belt means for adhering the length of fibrous material to the belt means for advancement to the mandrel means.

The air barrier means may take a number of forms but is shown herein in a preferred embodiment as comprising a structure having a bottom wall for sliding contact with the fibrous material and two upstanding side walls. The air barrier means is adapted to fit into a longitudinal trough formed by the air evacuating plenum means at the edge of the length of fibrous material and the conveyor means. The air flow through the apertures formed in the air evacuating plenums may be regulated by the upstanding side walls of the air barrier means as it raises and lowers in the trough formation. Stop means may be attached to the air barrier means to determine a lower limit of entry into the trough formation. Means may further be included for moving the air barrier means away from the mandrel means as the roll of fibrous material builds up on the mandrel means.

Means may be included for increasing the relative distance between the mandrel means and the conveyor means as the package builds up on the mandrel means. This may take the form of a conveyor which is yieldingly biased toward the mandrel means but is urged away from the mandrel means by the actual build up of the package. Alternatively, the conveyor means may remain stationary and the mandrel means be moved to increase the distance between the mandrel and the conveyor by such means as a rack and pinion arrangement connected to raise and lower the frame holding the mandrel for rotation.

The mandrel means is advantageously provided with an interior suction chamber having apertures communicating with the material receiving surface thereof to create a low pressure area adjacent the material receiving surface of the mandrel. In a preferred embodiment the mandrel is formed by a plurality of substantially parallel elements defining a plenum and extending transversely to the direction of travel of the conveyor means. The mandrel may further include opposing plates, a first plate having means for attaching a part of the elements thereto and means for removably securing the remainder of the elements, the second plate having means for removably securing the elements attached to the first plate and means for attaching the remainder of the elements thereto. The opposing plates may be made substantially the same size as the completed package and include means for creating low pressure areas on the package surfaces of the opposing plates to maintain air evacuation of the fibrous material as it is rolled onto the plurality of transverse elements. After the package has been completed and the sleeve adhesively secured to the outside thereof means may be utilized for separating the opposing plates and removing the removably securable elements from their respective supporting positions in the opposing plates in order to take the package off the mandrel for shipping and handling.

Other objects, advantages, and features of this invention will become apparent when the following description is taken in conjunction with the accompanying drawings, in which:

FIGURE 7 is an enlarged view in perspective of a portion of the mandrel means illustrated in FIGURE 6;

FIGURE 8 is a view in perspective of the air barrier means shown in FIGURE 1;

FIGURE 9 is an end elevational view illustrating an alternative method of supporting a conveyor structure for use in this invention;

FIGURE 10 is an end elevational view illustrating a third embodiment of conveyor support and an alternative embodiment of a mandrel means for use in this invention;

FIGURE 11 illustrates a view in perspective of a portion of the mandrel means shown in FIGURE 10;

FIGURE 12 illustrates a cross sectional view of air regulating means which may be utilized in the mandrel illustrated in FIGURES 10 and 11;

FIGURE 13 illustrates diagramatically a means for moving the mandrel means with respect to the conveyor means; and FIGURE 14 diagramatically illustrates an alternative approach to obtaining a rolled up configuration utilizing the principles stated hereinafter.

The present invention is described with reference to compacting and packaging lengths of fibrous material in mass formation such as fibrous materials formed from glass, slag, fusible rock or the like. The manufacture of lengths of fibrous materials has been carried on for several years, and such lengths have been used extensively for heating and acoustic insulation in buildings as well as heat insulation in appliances such as refrigerators, freezing units, ranges and water heaters and in other places where heat loss or heat transfer is to be avoided as far as possible.

Lengths of fibrous material of this character are usually formed by attenuation of fiber-forming material by high velocity gaseous blasts in a manner wherein the fibers are accumulated in haphazard or random assembly into a mass or mat of substantial thickness. The fact that the lengths of the mats or fibrous material are necessarily thick in order to obtain high insulating or sound-attenuating efficiency increases the cost of transportation and storage because of the bulk of the fibrous masses or mat lengths. While the mats are comparatively light in weight, they normally occupy a comparatively large volume per unit of weight.

As discussed hereinbefore, several methods of packaging have been tried and used with varying degrees of success. The major difficulty in most previous methods of packaging was that in mechanically compressing the mats to a degree where economical transportation was afforded there was sometimes resultant fiber breakage by the compression methods and apparatus used which reduced the insulating value and the ability of the fibers to spring back.

Figure 1:
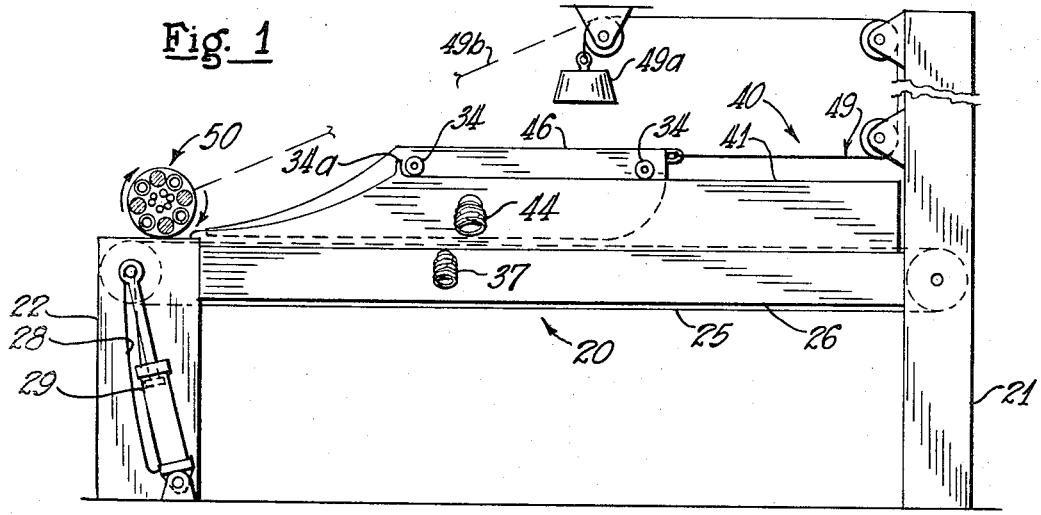
FIGURE 1 is a side elevational view of the conveyor means and air barrier means embodying the teachings of this invention.
Figure 2:
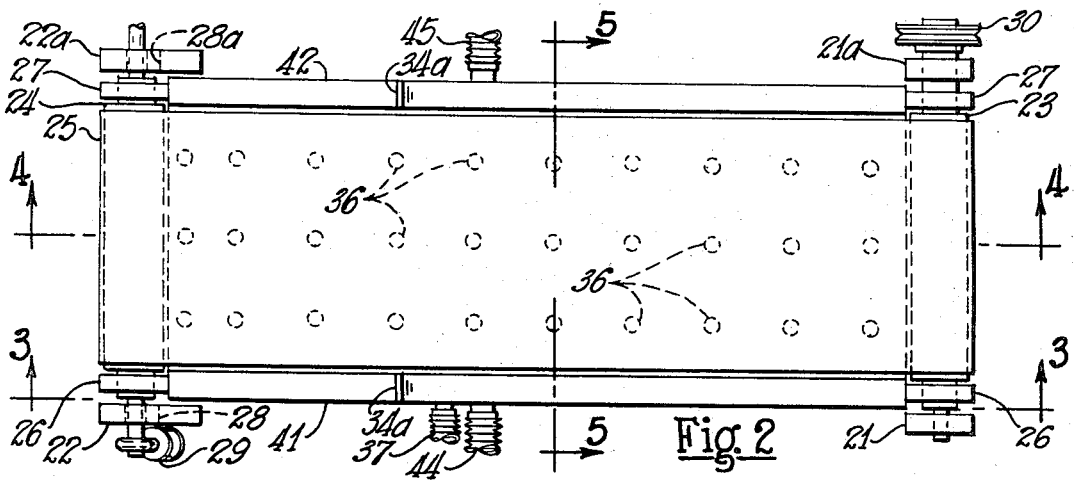
FIGURE 2 is a plan view of the apparatus illustrated in FIGURE 1.
Figure 3:
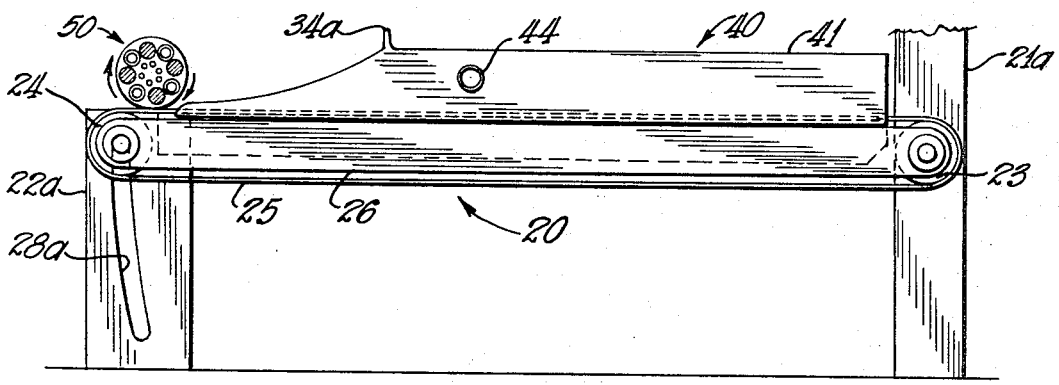
FIGURE 3 is a sectional view of the apparatus in FIGURE 2 taken along lines III—III.

It has been discovered that fibrous mats may have the air evacuated from within the mass of fibrous materials and greater compression is attained without the breakage of the fibers comprising the mass. Referring to FIGURE 1 there is illustrated a side elevational view of a conveyor and air evacuating means for delivering lengths of fibrous materials to a rotatable mandrel means. The conveyor means is indicated generally at 20 and has frame members 21 and 22 supporting it. Referring to FIGURES 2, 3, 4 and 5 in conjunction with FIGURE 1 it may be seen that conveyor rollers 23 and 24 support a conveyor belt 25 for rotation and endless movement therearound. Horizontally extending frame or strut members 26 and 27 have the conveyor rollers 23 and 24 journally supported at the end thereof. The frame members 26 and 27 maintain the rollers 23 and 24 a predetermined distance apart and allow a pivoting of the belt and roller assembly. The conveyor roller 23 is also journaled in frame members 21 and 21a. Means for applying a drive to the conveyor such as a pulley or sprocket means 30 is also connected to the conveyor roller 23. The driving means 30 is then connected to a power or driving source generally indicated at 31 in FIGURE 5.

Figure 4:
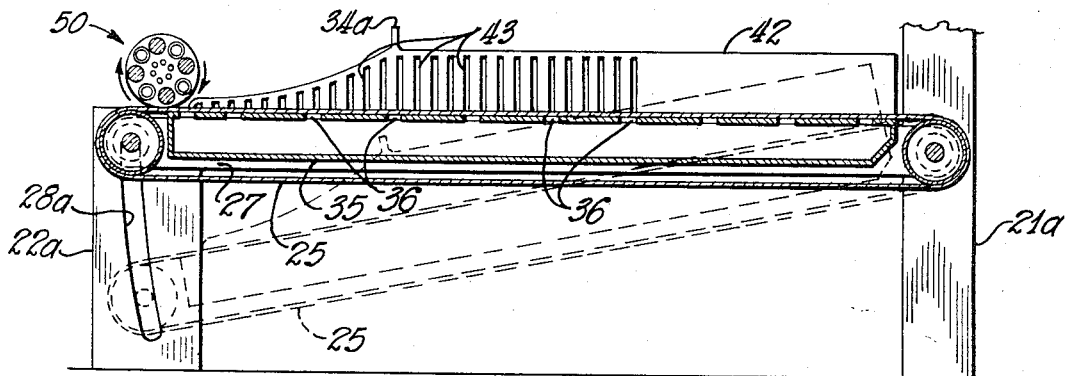
FIGURE 4 is a sectional view of the apparatus illustrated in FIGURE 2 taken along lines IV—IV.

The conveyor roller 24 while being journally supported in strut members 26 and 27 is yieldingly urged upwardly by at least one biasing means 29 operating against extensions of the conveyor roller 24 which protrude through slots 28 and 28a of frame members 22 and 22a. The biasing means 29 may be spring biased, air cylinder biased, hydraulically biased, etc. However, as a spiral roll of the length of fibrous material is being built up on the mandrel means generally indicated at 50 in FIGURE 1 the roller end 24 of the conveyor means 20 may be forced away from the mandrel 50 by the build up thereon against the pressure exerted by the biasing means 29. As the buildup continues the extensions of the conveyor roller 24 which protrude through the slots 28 and 28a are guided downwardly by the slots 28 and 28a as the entire forward end of the conveyor pivots about the axis of the conveyor roller 23, as indicated in FIGURE 4 by the dotted lines showing a disposition of the conveyor at a distance from its original position.

Lengths of fibrous material to be rolled up on the mandrel means 50 may be fed to the conveyor means 20 shown, by other conveyor or suitable means not shown. The ability of the conveyor means 20 to advance the length along the conveyor toward the mandrel means may advantageously be enhanced by the utilization of a plenum 36, best seen in FIGURES 4 and 5 which may be supported between conveyor strut members 26 and 27. The plenum 35 has a plurality of perforations 36 formed therein communicating with one side of the conveyor belt 25. The conveyor belt 25 must in this instance be of a foraminous material which will allow the creation by a negative pressure source via a flexible connection 37 to the plenum 35 of a low pressure area on the upper surface of the foraminous conveyor belt 25. This causes the underside of a length of fibrous material to adhere to the conveyor belt 25 to convey the length to the mandrel means 50. Normally such lengths of fibrous materials have a backing or a mounting material, usually of a heat reflective quality, which enhances the ability of the conveyor belt 25 to grip a length since the backing is an air barrier itself.

Means for evacuating the air from a length of fibrous material is generally indicated at 40 in FIGURES 1 through 5 and, in the embodiment shown herein, comprises a pair of plenums 41 and 42 disposed adjacent the conveyor means and adapted, via perforations 43 formed in the conveyor side of plenums 41 and 42, to withdraw or evacuate air from the edges of the lengths of fibrous material. Flexible connections 44 and 45 connect the plenums 41 and 42, respectively, to a negative pressure source, not shown.

In order to most effectively evacuate the air from the length of fibrous material, particularly when an air barrier means is not an integral part of the upper side of the mat being rolled up, an air barrier means 46 should be utilized. The air barrier means illustrated in the embodiment shown in FIGURES 1 through 5 comprises a sled-shaped structure having a bottom wall 47 and upstanding side walls 48. The air barrier means is constructed to fit snugly into the trough formation formed by the air evacuating means 41, 42 and the conveyor means 20. The air barrier means 46 thus acts as a barrier between the ambient pressures and the reduced pressure being formed in the interior of the mat being evacuated. Therefore the pressure of the ambient atmosphere in cooperation with the reduction of pressure within the interior of the mat acts to substantially compress the mat material being rolled up, to a considerable degree past that available through present methods. The air barrier means may have stop roller means 34 pivotally attached to the upstanding side walls 48 and adapted to rest on the upper portions of the air evacuating means 41 and 42 to prevent the air barrier means from going below a predetermined limit in the trough formation described hereinbefore. A line and pulley system generally indicated at 49 may be attached to the air barrier means 46 to control the position of the air barrier means along the conveyor 20. A weight such as 49a or a series of weights may be utilized to effect movement of the air barrier means 46 against the pull of the fibrous material of the suction pressures. A mechanical linkage between the line and pulley system 49 may alternatively be utilized as generally indicated at 49b in connection with the driving means for the mandrel means 50 so that the air barrier means 46 is moved away from the mandrel means 50 as the roll builds up on the mandrel means. Stop means 34a may be provided on the top of plenums 41 and 42 to prevent the advancement of the air barrier means 46 on roller means 34 past a predetermined point toward the mandrel means 50.

A view in perspective is shown in FIGURE 8 of the air barrier means 46 and illustrates a rounded forward end 47a to avoid creasing or tearing the length of material as it comes out from under the air barrier means 46, and a rounded rear end 47b which is adapted to assist in receiving and compressing the length of fibrous material as it finds its first contact with the air barrier means 46 as the length advances along the conveyor 20.

Figure 5:
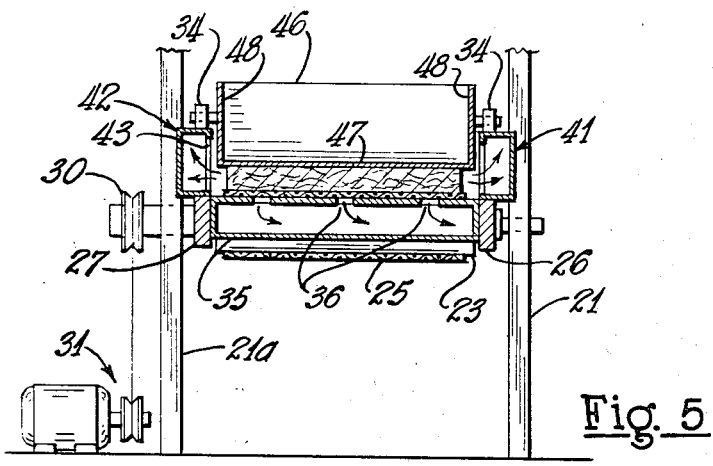
FIGURE 5 is a sectional view of the apparatus in FIGURE 2 taken along lines V—V.
Figure 6:
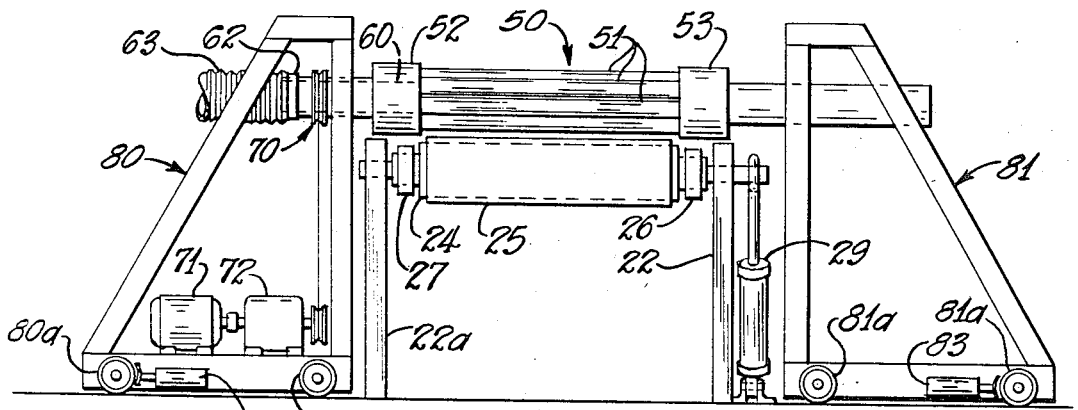
FIGURE 6 is an end elevational view of the apparatus embodying the teachings of this invention illustrating mandrel means suitable for use herein and its relative disposition to a conveyor of the type illustrated in FIGURE 1.

Referring to FIGURES 6 and 7 there is illustrated rotatable mandrel means and means for utilizing it in conjunction with the conveyor and air evacuating means shown in FIGURES 1 to 5. The rotatable mandrel means 50 may comprise a plurality of substantially parallel elements 51 defining a plenum extending transversely to the direction of travel of the conveyor belt 25. Opposing plates 52 and 53 are provided for supporting the parallel elements 51 defining the plenum. As can best be seen in FIGURE 7 a portion of the elements 51 are secured or attached to each face plate 52, 53 by any suitable means such as male and female thread on the elements 51 and within the plates 52, 53 respectively. Since it is desired to separate or dismantle the mandrel means for removal of a package, a first plate 52 may have means for attaching a part of the elements 51 thereto and means for removably securing the remainder of the elements. The second plate 53 similarly may have means for removably securing the elements 51 attached to the first plate and means for attaching the remainder of the elements thereto. This is accomplished by providing seating recesses 54 in the face of each plate so that as the opposing plates are advanced toward each other the ends of the removably securable parallel elements 51 may be guided into the seating apertures 54 by male guides 55 on the end of the respective elements 51. Thus the elements 51 are held against movement in the longitudinal direction of the conveyor as the mandrel means exerts a constant tension against the length of material being rolled upon the mandrel.

A plenum 60 is formed within at least one of the opposing plates 52, 53 and communicates with the interior of the plenum defined by the substantially parallel elements 51 via perforations 61. The elements 51 are preferably spaced very closely together so that the spaces between the elements 51 act as perforations, slots, or apertures against which the length of fibrous material may be adhered or attracted because of the reduced pressure within the plenum defined by the elements 51. The plenum 60 may be attached via a rotatable nipple coupling 62 and a flexible hose 63 to a negative pressure source, not shown.

It is desirable to maintain a constant tension on the length of material as it is being rolled up on the mandrel means 51. Therefore, instead of directly connecting the mandrel means 50 to a driving means via pulley or sprocket means 70, a motor means is connected to drive the mandrel means 50 through a clutch or torque converter means 72 which may maintain a constant torque on the mandrel means 50 as it is rotated. Although hydraulic or other drives such as illustrated diagrammatically at 72 may be utilized the mandrel means 50 could also be supported in bearing slots for horizontal movement and yieldingly urged at a constant pressure by a biasing means similar to that shown at 29 in connection with the biasing means 29 utilized to maintain the pivotal conveyor means 20 adjacent the roll up on the mandrel means 50.

The rotating opposing plates of the mandrel means 50 may be supported for rotation by frame structures 80 and 81 having suitable bearing means for journalling the rotatable mandrel means. Since it is desirable to move the opposing plates 52, 53 away from each other for removal of a package, a plurality of wheels 80a and 81a are provided for the frame structures 80, 81, respectively. The wheels 80a and 81a are advantageously located on tracks and may have upper or restraining rails above the wheels 80a and 81a to overcome any tendency of the mandrel means to tip the frames because of the constant or tension being maintained on the length of material as it is removed from the air evacuating and conveyor means 20 and 40, respectively. Braking means 82 and 83 may be provided for wheels 80a and 81a of the structures 80 and 81 to maintain the mandrel plates 52, 53 in the desired relative positions.

Referring to FIGURE 9 there is illustrated an alternative means for supporting the end of the conveyor 20 for movement relative to the mandrel means 50. A biasing means 29a similar to that shown in FIGURES 1 through 5 may be connected to a yoke 90, the arms of which are secured to the supporting struts 26, 27 of the conveyor means 20. The yoke may be connected to the struts 26, 27 at the extreme end thereof or at a position intermediate the length of the conveyor in order to completely remove the supporting means from interference with the operation of the mandrel in picking up the length of evacuated fibrous material from the conveyor means 20.

Referring to FIGURE 10 there is shown still another alternative embodiment of means for supporting a conveyor means 20a, which also is illustrated in an alternative form. A biasing-support means 29b similar to those illustrated hereinbefore is connected to a bearing means 95 which journally supports an end roller 96 of the conveyor means 20a. A single strut means may extend from the bearing means 95 back to a similar conveyor roller means located at the rear end of the conveyor, the rear conveyor roller may be supported in the fashion illustrated in FIGURE 10 or in the fashion illustrated in FIGURES 1 through 5. The conveyor belt is now split into sections 25a and 25b so that rotation may be effected on each side of the center support bearing 95. As in the apparatus shown in FIGURES 1 through 5 single or double plenums may be situated beneath the conveyor belt sections 25a and 25b to effect an adhering action by creating a low pressure area above or in the foraminous belt sections 25a and 25b. The advantages of this alternative is that a mandrel may be utilized having enlarged opposing plates for supporting parallel elements 51, such plates being noted at 100 in detail and in phantom at 101. The enlarged plates 100, 101 may then be made of sufficient size to completely enclose a rolled up package and act as a guide means. Further, plenums such as shown at 105 may be formed within the face plates 100, 101 enabling continuing evacuation or maintaining of evacuation of the air from within the interior of the length of the fibrous material via perforations 106 such as noted in the perspective view of the opposing plate 100 in FIGURE 11. The perforations 106 are in addition to the perforations 107 that may be formed to evacuate air from within the interior of the plenum formed by the substantially parallel elements or rods 151 on which the material is wrapped.

It may be desirable when utilizing the enlarged air evacuating opposing plates such as shown in FIGURE 11 to include therein means for regulating the suction effects of the perforations 106. This may be accomplished in a number of ways but there is illustrated a contact operated regulating means in FIGURE 12 which comprises a ball valve 107 held in seat 108 formed in the package surface of the plate 100 by a spring or other biasing means 109. In operation, as the package builds up, in spiral fashion around the parallel elements 151 the edges of the compressed fibrous material contact the ball valves 107 and force them open allowing a low pressure area to be established adjacent the perforation 106 which has its valve 107 open, to maintain or continue evacuation of air.

It should be noted that the apparatus shown herein may be operated in three fashions. That is, the arrangement shown in FIGURES 10, 11 and 12 may be utilized to extract the air from the interior of the fibrous materials without benefit of air evacuating means located along the conveyor prior to the length of material reaching the mandrel means 50. As shown in FIGURES 1 through 5 the apparatus may be utilized wherein air is evacuated only through the means 40 disposed adjacent the edge of the conveyor while the length of fibrous material is being wrapped spirally on a mandrel means 50 which does not have any air evacuating means connected therewith. The suction means within the plenum defined by the substantially parallel rods 51 may be eliminated if an alternative method for guiding the initial wrap of the length of fibrous material around the mandrel means 50 is substituted therefor. The third method, utilizing the equipment illustrated herein is, of course, the combination of all or any of the means and methods shown herein, including that to be yet described in FIGURE 14.

Referring to FIGURE 13 there is illustrated diagrammatically a rack and pinion means generally indicated at 110 and driven from the constant tension clutch, torque, hydraulic, or other drive 72 for lowering or raising the mandrel without disturbing the conveyor means in order to provide room as the package or roll builds up on mandrel means 50 if the conveyor means remains horizontal. Although only one rack or pinion means 110 is shown, it is to be recognized that a plurality are required to effect the raising of both sides or opposing plates of the mandrel means 50 to the proper height above the conveyor as the package builds up on the mandrel.

Referring to FIGURE 14 there is illustrated a different method of utilizing structure already described herein. A conveyor means 20, including the forward roller 24 and the belt 25, and air evacuating means 40, here represented by plenum 42 having perforations 43, are disposed similarly to the structure illustrated in FIGURES 1 to 5. The location of mandrel means 50 has been changed, however, to receive the evacuated mat from the conveyor means 20 over the top of the mandrel which is connected to rotate in the opposite direction, as shown by the arrows.

This structure may be used with fibrous materials that will not become entangled in a vacuum adhering application illustrated by plenum 36 beneath the foraminous belt 25 in FIGURES 4 and 5, since the length of fibrous material 160 is being fed through the conveyor with the open face of one major surface down. The remaining major surface will have a heat reflective or mounting material backing 161 adhered thereto, doing away with the need for an air barrier such as shown in FIGURE 8, since backing 161 acts as an air barrier permitting evacuation and compression of the mat.

In the apparatus illustrated it will still be desirable to move the mandrel means 50 and the conveyor means 20 away from each other as the package builds on the mandrel. This may be accomplished with rack and pinion means as shown in FIGURE 13, however, it will be preferable to move the mandrel means 50 in an inclined direction as noted by the arrows.

A guide plate 170 may advantageously be situated between conveyor means 20 and mandrel means 50 to provide a separation zone for the mat from the conveyor before the suction plenum within the mandrel adheres the mat to the mandrel. It may be desirable to extend the air evacuation means 40 past the end of conveyor means 20 as shown in FIGURE 14 to maintain the evacuation of the mat.

It should be noted that air adherence to the conveyor is not necessary in this or previous embodiments if means are provided for positively gripping the mat at its edges or otherwise are provided on the conveyor. Examples of positive gripping means would include edge clamp arrangements, perforations in the backing material matched with driving sprockets (as in movie film drives) claw or tooth engagement of the fibers, etc. Such perforations for positive gripping by the conveyor could be made in the surplus backing 161 that extends over the edge of the mat and is normally used for stapling or nailing the mat in place in its final usage.

It should be noted that the conveyor means 20 could be moved relative to mandrel means 50, if desired. It should also be noted that the opposing face plates of the mandrel means 50 may be enlarged in accordance with the teachings of the apparatus of FIGURES 10, 11 and 12. In brief, each portion of the structures shown herein may be modified for use with other portions to accomplish the function desired, i.e. evacuation of air from within the fibrous material to provide greater and more uniform compression than heretofore accomplished without disturbing the end efficiency or structure of the fibrous material. Experiments have shown that 30 percent more material may be compressed into the same size package providing a corresponding savings in transport, shipping, storage, and handling charges.

It is to be noted that the characterization of the fibrous material to packaged as mats, batts, etc., is not intended to be limiting but rather a generic description of material gathered together for compressing. Fibrous material is meant to include porous materials such as glass fibers, rock wool, felt, cotton, etc., as well as other synthetic compositions such as sponge rubber, foamed products, etc., especially those having interconnected or communicating air or gas pockets or passages.

It is apparent that, within the scope of the invention, modifications and different arrangements may be made other than is herein disclosed and the present disclosure is illustrative merely, the invention comprehending all variations thereof.

I claim:

1. Apparatus for packaging a length of porous mat in a compressed rolled-up configuration, the length having longitudinally extending opposing major surfaces and opposing edge surfaces, comprising mandrel means for receiving and rolling up the length of mat, means for conveying the length of mat to said mandrel means, and means disposed adjacent said conveyor means for evacuating air from within said porous mat through at least one edge surface thereof to compress and retain compressed the length of porous mat as it is rolled up on said mandrel.

2. Apparatus as defined in claim 1 in which said air evacuating means includes plenum means adapted to be connected to a negative pressure source and disposed adjacent said conveyor means, said plenum means having aperture means formed therein providing communication between said plenum means and an edge surface of the porous mat thereby evacuating air from within and compressing the porous mat.

3. Apparatus as defined in claim 2 in which said air evacuating means further includes air barrier means disposed between ambient air pressure and the surfaces of the porous mat not exposed to said aperture means.

4. Apparatus as defined in claim 3 in which said air barrier means includes a first barrier means adapted to be placed adjacent to one major surface of the length of porous mat and to be rolled up with the mat, and a second barrier means adapted to be held in sliding relationship with a second major surface of the porous mat.

5. Apparatus as defined in claim 1 in which said conveyor means includes foraminous conveyor belt means and plenum means adapted to be connected to a negative pressure source and disposed adjacent one side of said belt means, said plenum means having apertures formed therein adjacent said belt means to create a low pressure area on the opposite side of said belt means for gripping the length of porous mat for advancement to said mandrel means.

6. Apparatus as defined in claim 1 in which said air evacuating means includes plenum means adapted to be connected to a negative pressure source and disposed adjacent said conveyor means, said plenum means having apertures formed therein providing communication between said plenum means and the opposing edges of the porous mat for evacuating air from within said fibrous material.

7. Apparatus as defined in claim 6 which further includes air barrier means adapted for disposition in sliding relationship with and above the porous mat as it is advanced by said conveyor means during evacuation of air from the interior of the porous mat.

8. Apparatus as defined in claim 7 in which said plenum means comprises a plenum extending along each edge of said conveyor means.

9. Apparatus as defined in claim 8 in which said air barrier means comprises a structure having a bottom wall for sliding contact with the porous mat and two upstanding side walls, said air barrier means being adapted to fit into a longitudinal trough formed by said conveyor means and air evacuating plenums adjacent said conveyor means.

10. Apparatus as defined in claim 9 in which the air flow through the apertures formed in said air evacuating plenums is regulated by the upstanding side walls of said air barrier means as it raises and lowers in said trough formation.

11. Apparatus as defined in claim 9 in which stop means are attached to said air barrier means to determine a lower limit of entry into said trough formation.

12. Apparatus as defined in claim 9 which further includes means for moving said air barrier means away from said mandrel means as the roll of porous mat builds up on said mandrel means.

13. Apparatus as defined in claim 1 in which said mandrel means is provided with an interior suction chamber having apertures communicating with a mat receiving surface thereof to create a low pressure area adjacent said material receiving surface of said mandrel to maintain said mat in an evacuated state.

14. Apparatus as defined in claim 13 in which said mandrel is formed by a plurality of substantially parallel elements defining said suction chamber and extending transversely to the direction of travel of said conveyor means.

15. Apparatus as defined in claim 14 in which said mandrel further includes opposing plates, a first plate having means for attaching a part of said elements thereto and means for removably securing the remainder of said elements, the second plate having means for removably securing said elements attached to said first plate and means for attaching the remainder of said elements thereto.

16. Apparatus as defined in claim 15 in which said opposing plates are larger than the edge of a completed package and include means for creating low pressure areas on the package surfaces thereof to maintain air evacuation of the porous mat as it is rolled onto said plurality of transverse elements.

17. Apparatus as defined in claim 15 in which said opposing plates are larger than the edge of a completed package and which further includes plenum means adapted to be connected to a negative pressure source and communicating with a package surface of at least one of said opposing plates via apertures formed in said plate.

18. Apparatus as defined in claim 15 which further includes means for separating said plates upon completion of a package to permit removal of said package from said transversely extending elements.

19. A method for packaging a length of porous mat into a rolled-up configuration comprising the steps of evacuating air from within the length of porous mat to compress the mat and rolling the evacuated and compressed length of mat into a package.

20. A method for packaging a length of porous mat into a rolled-up configuration comprising the steps of conveying said length to a rotating mandrel, wrapping said length around said mandrel, and evacuating air from within the interior of said length of porous mat to compress said mat as said length is conveyed to and rolled onto said mandrel.

21. A method as defined in claim 20 which further includes applying a negative pressure to a perforated plenum within said rotating mandrel to adhere said length to said mandrel and to maintain said length evacuated and compressed as it is rolled onto said mandrel.

22. A method as defined in claim 20 which further includes providing opposing perforated plenum plates at each end of said mandrel and applying a negative pressure to said plenum plates to maintain the evacuation of air from the edges of said length as it is rolled onto said mandrel.

23. Apparatus for rolling up under compression a length of porous mat comprising rotatable mandrel means, means for evacuating air from within the length of porous mat to compress said mat, and means for feeding said evacuated and compressed length to said rotatable mandrel means.

24. Apparatus as defined in claim 23 in which said feeding means comprises conveyor means for advancing said length to said rotatable mandrel means and which further includes means for maintaining a substantially constant tension on said length as it is rolled onto said mandrel means.

25. Apparatus as defined in claim 23 in which said air evacuating means comprises perforated plenums adapted for connection to a negative pressure source and disposed adjacent minor edge surfaces of the length of mat, and air barrier means disposed adjacent major surfaces of said length.

References Cited

UNITED STATES PATENTS

| | | | |
|---|---|---|---|
| 2,774,995 | 12/1956 | Sandelin | 19—288 X |
| 2,794,214 | 6/1957 | Sandelin | 19—248 |
| 2,999,653 | 9/1961 | Ganz | 242—66 X |
| 3,222,730 | 12/1965 | Kalwaites | 226—95 X |

FOREIGN PATENTS

| | | |
|---|---|---|
| 861,097 | 2/1961 | Great Britain. |

WILLIAM S. BURDEN, *Primary Examiner.*